(12) United States Patent
Fujiki et al.

(10) Patent No.: US 9,269,958 B2
(45) Date of Patent: Feb. 23, 2016

(54) CATHODE AND ALL-SOLID BATTERY INCLUDING THE SAME

(71) Applicant: SAMSUNG ELECTRONICS CO., LTD., Suwon-si, Gyeonggi-do (KR)

(72) Inventors: Satoshi Fujiki, Yokohama (JP); Hironari Takase, Yokohama (JP)

(73) Assignee: SAMSUNG ELECTRONICS CO., LTD. (KR)

( * ) Notice: Subject to any disclaimer, the term of this patent is extended or adjusted under 35 U.S.C. 154(b) by 150 days.

(21) Appl. No.: 14/099,202

(22) Filed: Dec. 6, 2013

(65) Prior Publication Data

US 2014/0162141 A1    Jun. 12, 2014

(30) Foreign Application Priority Data

Dec. 7, 2012 (JP) ................................. 2012-268111
Aug. 28, 2013 (KR) ........................ 10-2013-0102664

(51) Int. Cl.
*H01M 4/136* (2010.01)
*H01M 4/62* (2006.01)
*H01M 10/052* (2010.01)
*H01M 10/0562* (2010.01)
*H01M 4/131* (2010.01)

(52) U.S. Cl.
CPC ............. *H01M 4/628* (2013.01); *H01M 4/131* (2013.01); *H01M 10/052* (2013.01); *H01M 10/0562* (2013.01); *Y02E 60/122* (2013.01)

(58) Field of Classification Search
CPC .......... H01M 10/052; H01M 10/0562; H01M 10/0563
See application file for complete search history.

(56) References Cited

U.S. PATENT DOCUMENTS

| | | | |
|---|---|---|---|
| 6,852,446 | B2 | 2/2005 | Barbarich |
| 2005/0175898 | A1* | 8/2005 | Yong et al. ................. 429/231.1 |
| 2006/0062721 | A1* | 3/2006 | Tsay et al. .................. 423/594.6 |
| 2006/0222584 | A1* | 10/2006 | Welz-Biermann et al. ... 423/377 |
| 2012/0189918 | A1* | 7/2012 | Tatsumisago et al. ........ 429/322 |

FOREIGN PATENT DOCUMENTS

| | | |
|---|---|---|
| JP | 09-265984 A | 10/1997 |
| JP | 09-330720 A | 12/1997 |
| JP | 2005-536832 A | 12/2005 |
| JP | 2011-142073 A | 7/2011 |
| JP | 5092292 B2 | 9/2012 |
| WO | 03043102 A2 | 5/2003 |

* cited by examiner

*Primary Examiner* — Stewart Fraser
*Assistant Examiner* — Olatunji Godo
(74) *Attorney, Agent, or Firm* — Cantor Colburn LLP

(57) ABSTRACT

A positive electrode for an all-solid battery including a positive active material; a conductive material; and a binder, wherein the positive electrode further includes a cyano compound represented by Formula 1:

$$M[A(CN)_x] \quad \text{Formula 1}$$

wherein in Formula 1, A is at least one selected from boron, gallium, aluminum, fluorine, phosphorus, and carbon, M is at least one alkali metal, and x is an integer of 1 to 4.

9 Claims, 2 Drawing Sheets

CATHODE AND ALL-SOLID BATTERY INCLUDING THE SAME

CROSS-REFERENCE TO RELATED APPLICATIONS

This application claims priority to Japanese Patent Application No. 10-2012-268111, filed on Dec. 7, 2012, in the Japanese Patent Office and Korean Patent Application No. 10-2013-0102664, filed on Aug. 28, 2013, in the Korean Intellectual Property Office, and all the benefits accruing therefrom under 35 U.S.C. §119, the contents of which are incorporated herein in their entirety by reference.

BACKGROUND

1. Field

The present disclosure relates to positive electrodes for all-solid batteries and all-solid batteries including the positive electrodes, and more specifically to positive electrodes for all-solid batteries having excellent battery characteristics and all-solid batteries including the positive electrodes.

2. Description of the Related Art

Among lithium-ion secondary batteries, all-solid batteries using solid electrolytes are known. An all-solid battery includes an electrolyte layer including a solid electrolyte, electrodes (positive and negative electrodes) formed on opposite sides of the electrolyte layer, and a current collector attached to each electrode. As the solid electrolyte, a sulfide-based, i.e., a sulfide-containing, solid electrolyte having high ion conductivity is known.

For a lithium-ion secondary battery, a carbon material that does not include lithium is used as an active material in a negative electrode and a transition metal oxide including lithium, such as a lithium cobalt oxide ($LiCoO_2$), a lithium nickel oxide ($LiNiO_2$), or a lithium manganese oxide ($LiMn_2O_4$) is used as a positive active material. Furthermore, because the positive active material has low lithium-ion conductivity, a solid electrolyte is generally included in the positive electrode.

As a solid electrolyte included in the positive electrode, a sulfide-based solid electrolyte having excellent lithium-ion conductivity is used; however, due to high reactivity of sulfide, the sulfide-based solid electrolyte reacts with the electrode active material, more specifically, with the positive active material, to form a highly resistive layer of an oxide at an interface of the solid electrolyte and the positive active material, and increases interfacial resistance. Thus, a lithium-ion secondary battery formed therefrom does not have good charge and discharge characteristics.

In one method known in the art to solve the above-described problems, a lithium-ion conductive oxide is coated on a surface of a positive active material particle to inhibit counter diffusion between the positive active material and the solid electrolyte, which inhibits the formation of the highly resistive layer on the interface of the positive material and the solid electrolyte, to thereby improve output characteristics of an all-solid lithium secondary battery formed therefrom. Coating the lithium-ion conductive oxide on the surface of the positive active material particle is performed by a method such as electro-spraying; however, processes for the coating can be difficult or complicated and thus, the processes are difficult to use on a commercial scale that would allow production to keep up with the increase in demand for lithium-ion secondary batteries.

SUMMARY

Provided are positive electrodes for all-solid batteries, which inhibit the formation of highly resistive layers on interfaces between positive active materials and solid electrolytes without coating the positive active materials, and all-solid batteries including the positive electrodes.

Additional aspects will be set forth in part in the description which follows and, in part, will be apparent from the description, or may be learned by practice of the presented embodiments.

According to an aspect of the present disclosure, provided is a positive electrode for an all-solid battery including
a positive active material;
a conductive material; and
a binder,
wherein the positive electrode may further include a cyano compound represented by Formula 1:

$$M[A(CN)_x]  \qquad \text{Formula 1}$$

wherein in Formula 1,
A may be at least one selected from boron, gallium, aluminum, fluorine, phosphorus, and carbon,
M may be at least one alkali metal, and
x may be an integer of 1 to 4.

According to another embodiment of the present disclosure, the alkali metal may be lithium or sodium.

According to another embodiment, the cyano compound may be lithium tetracyanoborate.

According to another embodiment, the cyano compound may be attached to at least a portion of the positive active material or may be located adjacent the positive active material.

According to another embodiment of the present disclosure, the positive active material may include a lithium-containing transition metal oxide, wherein the lithium-containing transition metal oxide may include at least one element selected from nickel, cobalt, and manganese.

According to another embodiment of the present disclosure, the cyano compound may be present in an amount of about 0.5 parts by weight to about 10 parts by weight based on 100 parts by weight of a total weight of the positive active material, the conductive material, and the binder.

According to another embodiment of the present disclosure, provided is an all-solid battery including
a positive electrode;
a negative electrode; and
an electrolyte layer disposed between the positive electrode and the negative electrode,
and including a solid electrolyte, wherein
the positive electrode is the positive electrode described herein.

According to another embodiment of the present disclosure, the solid electrolyte may include a sulfide-containing solid electrolyte.

According to another embodiment of the present disclosure, the solid electrolyte may include a lithium-ion conductive crystalline glass.

According to another embodiment of the present disclosure, the solid electrolyte may include lithium sulfide as a first component, and at least one compound selected from silicon sulfide, phosphorus sulfide, germanium sulfide, and boron sulfide as a second component.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
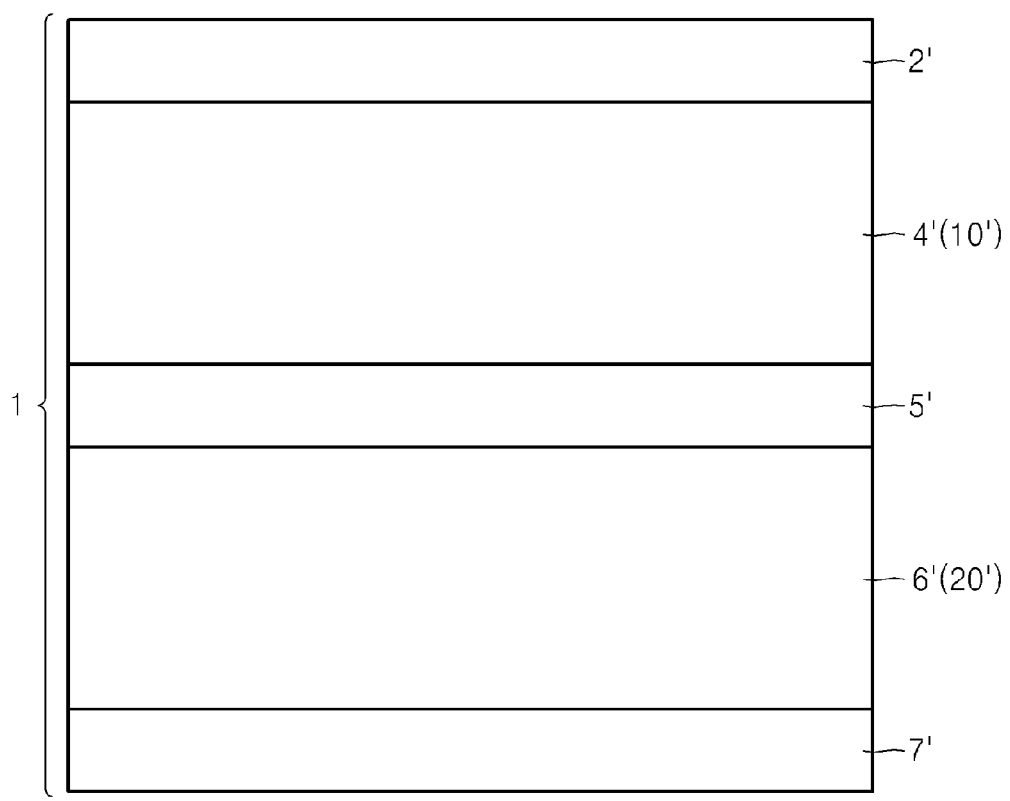
FIG. 1A is a schematic view of a structure of an all-solid battery according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise. The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A positive electrode for an all-solid battery according to an aspect of the present disclosure is a positive electrode including a positive active material,
a conductive material, and
a binder, wherein the positive electrode further includes a cyano compound represented by the following Formula 1:

$$M[A(CN)_x] \qquad \text{Formula 1}$$

wherein in Formula 1,

A is at least one selected from boron, gallium, aluminum, fluorine, phosphorus, and carbon, M is at least one alkali metal, and x is an integer of 1 to 4.

While not wanting to be bound by theory, it is understood that by including the cyano compound of Formula 1 above in the positive electrode, a reaction between the positive active material and the solid electrolyte may be prevented without a separate coating on the positive active material.

The cyano compound may be attached to at least a portion of the positive active material or may be located near, e.g., adjacent to, the positive active material. Accordingly, a reaction between the positive active material and the solid electrolyte, and formation of a highly resistive layer on an interface between the positive active material and the solid electrolyte may be prevented.

In Formula 1, M may be lithium or sodium.

The cyano compound of Formula 1 may be, for example, lithium tetracyanoborate.

Figure 1B:
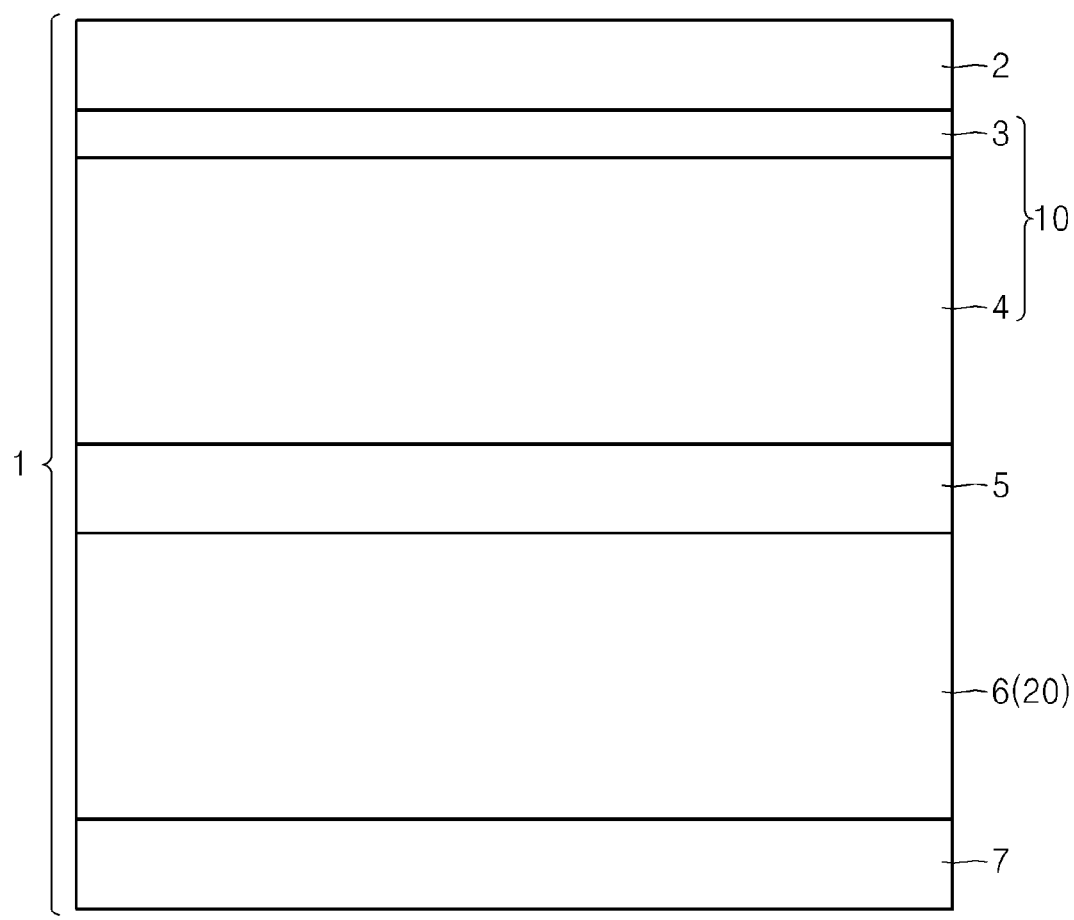
FIG. 1B is a schematic view of a structure of an all-solid battery according to another embodiment of the present disclosure.

FIG. 1A is a schematic view of a structure of an all-solid battery according to an embodiment of the present disclosure. The all-solid battery 1' according to an embodiment of the present disclosure includes a positive current collector 2', a positive electrode layer 4', an electrolyte layer 5', a negative electrode layer 6', and a negative current collector 7'. A positive electrode 10' includes the positive electrode layer 4', and a negative electrode 20' includes the negative electrode layer 6'. FIG. 1B is a schematic view of a structure of an all-solid battery 1 according to another embodiment of the present disclosure. The all-solid battery 1 of FIG. 1B includes the same features as the all-solid battery 1' of FIG. 1A, except that the all-solid battery 1 of FIG. 1B further includes an adhesive layer 3 between the positive current collector 2 and the positive electrode layer 4. The adhesive layer 3 and the positive electrode layer 4 are included in the positive electrode 10 of the all-solid battery 1. Also, the negative electrode layer 6 is included in the negative electrode 20 in the all-solid battery 1. Hereinafter, an all-solid battery according to an embodiment of the present disclosure will be described in greater detail with reference to FIG. 1B.

Any suitable conducting material may be used as the positive current collector 2. For example, aluminum, stainless steel, or nickel-plated steel may be used.

The adhesive layer 3 binds the positive current collector 2 and the positive electrode layer 4. The adhesive layer 3 may include an adhesive layer conductive material, a first binder, and a second binder. The adhesive layer conductive material may be, for example, carbon black such as Ketjen black and acetylene black; graphite; natural graphite; and synthetic graphite; which may be used alone or as a mixture thereof. The adhesive layer conductive material may be any material that may increase conductivity of the adhesive layer 3.

The first binder included in the adhesive layer 3 may be, for example, a non-polar polymer that does not have a polar functional group. Examples of polar functional groups include carboxylic acids and esters thereof, sulfur-containing acids and esters thereof such as sulfonic acids and esters thereof, phosphorus-containing acids and esters thereof, such as phosphoric acid and esters thereof and phosphonic acids and esters thereof, nitro groups, cyano groups, hydroxyl groups, ether groups, sulfhydryl groups, primary, secondary, or tertiary amine groups, primary or secondary amido groups, ureido groups, and sulfonyl groups. Accordingly, the first binder may be inactive with respect to a highly reactive solid electrolyte, more particularly to a sulfide-based solid electrolyte. The sulfide-based solid electrolyte is known to be active with respect to polar structures such as acids, alcohols, amines, and ethers. The first binder is used to bind the positive current collector 2 to the positive electrode layer 4. In this regard, when the positive electrode layer 4 includes the first binder or a similar component, the first binder in the adhesive layer 3 may counter-diffuse against the first positive electrode layer binder 4 through an interface between the adhesive layer 3 and the positive electrode layer 4, to thereby firmly bind the positive current collector 2 and the positive electrode layer 4.

Examples of the first binder include a styrene-based, i.e., styrene-containing thermoplastic elastomer such as a styrene-butadiene-styrene block polymer ("SBS"), a styrene-ethylene-butadiene-styrene block polymer ("SEBS"), and a styrene-styrene/butadiene)-styrene triblock copolymer blend; a styrene (ethylene/propylene)-styrene block copolymer ("SEPS"); a styrene-isoprene-styrene block copolymer ("SIS"), a styrene-butadiene rubber ("SBR"); a butadiene rubber ("BR"); a natural rubber ("NR"); an isoprene rubber ("IR"); an ethylene-propylene-diene monomer ("EPDM") rubber, and a partially hydrogenated product thereof. Further examples include polystyrene, polyolefin, an olefin-based thermoplastic elastomer, a poly(cycloolefin), and a silicone polymer.

The second binder may be a binder that has a stronger adhesiveness than the first binder, with respect to the positive current collector 2. Whether a binder has a strong adhesiveness with respect to the positive current collector 2 may be determined by, for example, measuring the strength needed to separate a binder film from the positive current collector 2, the binder film obtained by coating a binder solution on the positive current collector 2 and then drying the same. The second binder may be, for example, a polar functional group-containing polymer, which includes a polar functional group to strongly bind to the positive current collector 2 through hydrogen bonding or the like. However, the second binder may be highly reactive to a sulfide-based solid electrolyte and thus, the second binder may not be included in the positive electrode layer 4.

Examples of the second binder include, for example, nitrile-butadiene rubber ("NBR"), chloroprene rubber ("CR") and a partially hydrogenated product or a completely hydrogenated product thereof, a polyacrylic acid ester copolymer, polyvinylidene fluoride ("PVDF"), vinylidene fluoride-hexafluoropropylene copolymer ("VDF-HFP") and a carboxylate modified product thereof, chlorinated polyethylene ("CM"), polymethacrylic acid ester, polyvinyl alcohol, ethylene-vinyl alcohol copolymer, polyimide, polyamide, and polyamide imide. In addition, the second binder may be a polymer in which the first binder is co-polymerized with a monomer having carboxylic acid, sulfonic acid, or phosphoric acid.

Proportions of amounts of the adhesive layer conductive material, the first binder, and the second binder in the adhesive layer 3 are not particularly limited, but the proportions may be, for example, about 50 percent by weight ("weight %") to about 95 weight % for the conductive material, about 3 weight % to about 30 weight % for the first binder, and about 2 weight % to about 20 weight % for the second binder based on the total weight of the adhesive layer.

The positive electrode layer 4 may include
a sulfide-based solid electrolyte,
a positive active material,
a positive electrode layer conductive material, and
a binder.

The conductive material of the positive electrode layer in the positive electrode layer 4 may be the same as the conductive material of the adhesive layer.

An example of the sulfide-based, i.e., sulfide-containing, solid electrolyte may be an electrolyte that includes at least lithium sulfide as a first component, and at least one selected from silicon sulfide, phosphorus sulfide, germanium sulfide, and boron sulfide as a second component, for example, $Li_2S$—$P_2S_5$. The sulfide-based solid electrolyte is known to have greater lithium ion conductivity than that of other inorganic compounds. For example, the sulfide-based solid electrolyte may include $SiS_2$, $GeS_2$, or $B_2S_3$, in addition to $Li_2S$—$P_2S_5$. Also, the positive electrode layer 4 may further include $Li_3PO_4$, halogen, or a halogen compound, in addition to the sulfide-based solid electrolyte.

$Li_2S$ and $P_2S_5$ at a selected ratio may be heated at about 300° C. to 1200° C., for example 300° C. to 500° C., e.g., a temperature higher than melting temperatures thereof, to melt-mix $Li_2S$ and $P_2S_5$, maintained at the temperature for a predetermined period of time, and then rapidly quenched to obtain the sulfide-based solid electrolyte (melt quenching technique). Also, $Li_2S$—$P_2S_5$ may be obtained through mechanical milling. A mixing ratio of $Li_2S$ and $P_2S_5$ may be a molar ratio of about 50:50 to about 80:20, for example about 60:40 to about 75:25, or for example, about 70:30 to about 80:20.

An electrolyte layer 5 of the all-solid battery 1 includes a solid electrolyte. Examples of the solid electrolyte may include a lithium-ion conductor including an inorganic compound as an inorganic solid electrolyte, in addition to the sulfide-based solid electrolyte. The lithium-ion conductor may be, for example, $Li_3N$, LISICON (available from Ceramatec, Inc. of Salt Lake City, Utah), $Li_{3+y}PO_{4-x}N_x$ ("LIPON"), $Li_{3.25}Ge_{0.25}P_{0.75}S_4$ ("thio-LISICON"), and $Li_2O$—$Al_2O_3$—$TiO_2$—$P_2O_5$ ("LATP"). The inorganic compound may have a crystal structure, an amorphous structure, a glass form structure, a glass ceramic (e.g., a crystalline glass) structure, or the like. Among these, lithium-ion conductivity of a crystallized glass structure is greater than that of the amorphous structure.

The positive active material may be any suitable material that may reversibly intercalate and deintercalate lithium-ions, and examples may include lithium cobalt oxide ("LCO"), lithium nickel oxide, lithium nickel cobalt oxide, lithium nickel cobalt aluminum oxide (hereinafter, referred to as "NCA"), lithium nickel-cobalt-manganese oxide (hereinafter, referred to as "NCM"), lithium manganese oxide, lithium iron phosphate, nickel sulfide, copper sulfide, sulfur, iron oxide, and vanadium oxide. The positive active material may be used alone or two or more thereof may be used together.

The positive active material may be, for example, a lithium salt of a transition metal oxide having a layered halite structure. The term "layered" as used herein refers to a thin sheet form, and the term "halite structure" refers to a sodium chloride structure, which is a type of crystal structure, and is a structure in which positive ions and negative ions, which separately have a face-centered cubic lattice, are dislocated by ½ of a corner of each lattice unit. Examples of lithium salts of transition metal oxides, which have the layer-form halite structure, include, for example, a lithium salt of a ternary transition oxide represented by $Li_{1-x-y-z}Ni_xCo_yAl_zO_2$ ("NCA") or $Li_{1-x-y-z}Ni_xCo_yMn_zO_2$ ("NCM") (0<x<1, 0<y<1, 0<z<1, and x+y+z<1).

The positive electrode layer binder may be, for example, a non-polar polymer that does not have a polar functional group as described above. Accordingly, the positive electrode layer binder may be inactive with respect to a highly reactive solid electrolyte, for example, the sulfide-based solid electrolyte. The positive electrode layer binder may include the above-described first binder. When an electrolyte of the all-solid battery 1 is the sulfide-based solid electrolyte, which is highly reactive to the electrolyte, the positive electrode layer binder may be a non-polar polymer.

When the positive electrode layer 4 is to be directly attached to the positive current collector 2, the positive electrode layer 4 may not sufficiently attach to the positive current collector 2. Accordingly, the adhesive layer 3, including the first binder and the second binder, may be disposed between the positive electrode layer 4 and the positive current collector 2. As a result, the first binder in the adhesive layer 3 may firmly attach to the positive electrode layer 4, and the second binder in the adhesive layer 3 may firmly attach to the positive current collector 2, such that the positive current collector 2 may firmly attach to the positive electrode layer 4. In this regard, when the first binder is included in the positive electrode layer binder, the first binder in the adhesive layer 3 may counter diffuse against the first positive electrode layer binder 4 through the interface between the adhesive layer 3 and the positive electrode layer 4, to thereby firmly attach the positive electrode layer 4 to the positive current collector 2.

The sulfide solid electrolyte has excellent lithium-ion conductivity but sulfide is highly reactive. Thus, the sulfide solid electrolyte may react with the positive active material to form a highly resistive layer at and/or on the interface of the solid electrolyte and the positive active material, increasing interfacial resistance, which may deteriorate charge and discharge characteristics of a lithium-ion all-solid battery. The positive electrode includes the cyano compound of Formula 1 to prevent the formation of the highly resistive layer on the interface between the positive active material and the solid electrolyte. In other words, the positive electrode includes the cyano compound of Formula 1 to improve discharge characteristics of a battery, as in the case of a coating treatment for a positive active material. The cyano compound of Formula 1 may be attached to at least part of the positive active material or may exist near the positive active material, for example, to form an adhesive layer of the cyano compound on the positive active material during a first charging cycle of the all-solid battery, to thereby inhibit a reaction between the sulfide-based solid electrolyte and the positive active material. Also, the cyano compound may exist near the positive active material to facilitate lithium-ion conductivity from the positive active material to the solid electrolyte.

Proportions of the sulfide-based solid electrolyte, the positive active material, the positive electrode layer conductive material, and the positive electrode layer binder, which are included in the positive electrode, are not particularly limited. For example, the sulfide-based solid electrolyte may be in a proportion of about 20 weight % to about 50 weight %, the positive active material may be in a proportion of about 45 weight % to about 75 weight %, the positive electrode layer conductive material may be in a proportion of about 1 weight % to about 10 weight %, the positive electrode layer binder may be in a proportion of about 0.5 weight % to about 4 weight %, based on the total weight of the positive electrode layer 4. Also, the amount of the cyano compound of Formula 1 above may be about 0.05 parts by weight to about 10 parts by weight based on 100 parts by weight of a total sum of amounts of the positive active material, the positive electrode layer conductive material, and the positive electrode layer binder. When the amount of the cyano compound is in the ranges above, the reaction between the solid electrolyte and the positive active material may be inhibited while the battery capacity is maintained. For example, the amount of the cyano compound of Formula 1 above may be about 1 part by weight to about 3 parts by weight.

The cyano compound may be, for example, $LiB(CN)_4$, $LiAl(CN)_4$, $LiGa(CN)_4$, $LiPF_3(CN)_4$, and $LiC(CN)_3$, which may be used alone or as a mixture thereof.

The electrolyte layer 5 may include the sulfide-based solid electrolyte and an electrolyte binder. The electrolyte binder may be a non-polar polymer that does not have a polar functional group as described above. Accordingly, the electrolyte binder is inactive with respect to a highly reactive solid electrolyte, for example, to the sulfide-based solid electrolyte. The electrolyte binder may include the first binder.

The first binder in the electrolyte layer 5 may counter-diffuse against the first positive electrode layer binder 4 through an interface between the positive electrode layer 4 and the electrolyte layer 5, thereby firmly binding the positive electrode layer 4 and the electrolyte layer 5. Also, proportions of the sulfide-based solid electrolyte and the electrolyte binder are not particularly limited. For example, the sulfide-based solid electrolyte may be used in an a proportion of about 95 weight % to about 99 weight %, and the electrolyte binder may be used in a proportion of about 0.5 weight % to about 5 weight %, based on a total weight of the electrolyte layer 5.

The negative electrode layer 6 may include a negative active material and a negative electrode binder. The negative electrode binder may be the first binder described above. The first binder of the negative electrode layer 6 may counter-diffuse against the first binder in the electrolyte layer 5 through an interface between the negative electrode layer 6 and the electrolyte layer 5, to thereby firmly bind the negative electrode layer 6 and the electrolyte layer 5. Also, the negative electrode binder may include a second binder having a polar functional group as described above, in addition to the first binder.

Examples of the negative active material include a graphite-based active material, for example, synthetic graphite, natural graphite, a mixture of the synthetic graphite and the natural graphite, and natural graphite coated with synthetic graphite.

When manufacturing the all-solid battery 1, the sulfide-based solid electrolyte may swell from the electrolyte layer 5 into the negative electrode layer 6. In other words, the negative electrode layer 6 may include the sulfide-based solid electrolyte. Accordingly, when the negative electrode layer 6 includes the second binder, the second binder reacts with the sulfide-based solid electrolyte in the negative electrode layer 6, and thus, the sulfide-based solid electrolyte in the negative electrode layer 6 may be degraded. However, when the negative active material is a graphite-based active material, swelling effects may not be significant. In other words, when the negative active material is a graphite active material, the negative electrode layer 6 may not necessarily include the sulfide-based solid electrolyte, and the sulfide-based solid electrolyte in the electrolyte layer 6 may not swell into an interface of the negative electrode layer 6 and the negative current collector 7.

Accordingly, the negative electrode layer 6 may include the second binder. The second binder firmly binds to the negative current collector 7 through hydrogen bonding. However, the second binder alone may not sufficiently bind the negative electrode layer 6 to the electrolyte layer 5. Accordingly, the negative electrode layer 6 may include the first binder, in addition to the second binder. As a result, the first binder may firmly bind to the electrolyte layer 5. Meanwhile, when the electrolyte layer 5 includes the first binder, the first binder in the negative electrode layer 6 may counter-diffuse against the first binder in the electrolyte layer 5 through an interface between the negative electrode layer 6 and the electrolyte layer 5, thereby firmly binding the negative electrode layer 6 to the electrolyte layer 5.

The negative active material may be tin or silicon material instead of graphite.

Proportions of the negative active material, the first binder, and the second binder are not particularly limited. For example, a proportion of the negative active material may be about 95 weight % to about 99 weight %, a proportion of the first binder may be about 0.5 weight % to about 5 weight %, and a proportion of the second binder may be about 0.5 weight % to about 5 weight %, based on a total weight of the negative electrode layer 6.

The negative current collector 7 may be any conducting material, such as nickel, copper, stainless steel, or nickel-plated steel. Also, each layer may suitably include a known additive.

Hereinafter, a method of manufacturing the all-solid battery 1, according to an embodiment of the present disclosure, is described in detail. First, an adhesive layer coating solution including a first binder, a second binder, an adhesive layer conductive material, and a first solvent for dissolving the first binder and the second binder are prepared. In this regard, the first solvent may be, for example, an amide solution such as N-methylpyrrolidone ("NMP"), N, N-dimethyl formamide ("DMF"), and N, N-dimethylacetamide ("DMA"); an alkyl ester solvent such as butyl acetate and ethyl acetate; a ketone solvent such as acetone, methyl ethyl ketone, and methyl isobutyl ketone; an ether solvent such as tetrahydrofuran and diethyl ether; and an alcohol solvent such as methanol, ethanol, and isopropyl alcohol.

The adhesive layer 3 may not include the sulfide-based solid electrolyte or may include a small amount of the sulfide-based solid electrolyte swelled from the positive electrode layer 4, and thus, a polar solvent may be used as the first solvent. The first solvent may dissolve the first binder and the second binder.

The adhesive layer coating solution is coated on the positive current collector 2 and then dried to prepare the adhesive layer 3. Also, the adhesive layer coating solution is coated on a substrate of a desktop screen printer or the like and then dried to prepare an adhesive film. The adhesive film may then be pressed on the positive current collector 2.

Thereafter, a positive electrode layer coating solution including a sulfide-based solid electrolyte and a positive active material, a positive electrode layer conductive material, a positive electrode layer binder, a cyano compound of Formula 1, and a second solvent for dissolving the positive electrode layer binder is prepared. The second solvent dissolves the positive electrode layer binder (the first binder), but does not dissolve the second binder. In an embodiment, the second solvent is a non-polar solvent such as an aromatic hydrocarbon such as xylene, toluene, and ethyl benzene; and an aliphatic hydrocarbon such as pentane, hexane, and heptane.

The positive electrode layer coating solution is coated on the binding layer 3 and then dried to prepare a positive electrode layer 4. As a result, the first binder in the adhesive layer 3 dissolves in the second solvent and then swells into the positive electrode layer 4, thereby more firmly binding the adhesive layer 3 to the positive electrode layer 4. According to the embodiment, the positive electrode 10 is prepared by coating, and thus, a large surface area positive electrode 10 may be easily manufactured and a large capacity all-solid battery 1 may be easily manufactured.

Also, the second solvent does not dissolve the second binder, and thus, when the adhesive layer 3 is coated with the positive electrode layer coating solution, the second binder in the adhesive layer 3 may be prevented from swelling into the positive electrode layer 4. As a result, the sulfide-based solid electrolyte in the positive electrode layer 4 may be prevented from degradation caused by the second binder. As a result of the processes described above, a positive electrode structure including the positive current collector 2, the adhesive layer 3, and the positive electrode layer 4 is manufactured.

In addition, the negative electrode layer coating solution including the first binder, the second binder, the negative active material, and the first solvent is prepared. The negative electrode layer 6 does not need to include the sulfide-based solid electrolyte, and thus, a polar solvent may be used as the first solvent. The negative electrode layer coating solution is coated on the negative current collector 7 and then dried to prepare a negative electrode layer 6. As a result, a negative electrode structure is prepared.

Then, an electrolyte layer coating solution including the sulfide-based solid electrolyte, the electrolyte binder, and the second solvent is prepared. The second solvent dissolves the electrolyte binder (first binder), but does not dissolve the second binder. The electrolyte layer coating solution is coated on the negative electrode layer 6 and then dried to prepare an electrolyte layer 5. As a result, the first binder in the negative electrode layer 6 dissolves in the second solvent and swells into the electrolyte layer 5, thereby firmly binding the electrolyte layer 5 and the negative electrode layer 6. Also, the second solvent does not dissolve the second binder, and thus, when the electrolyte layer coating solution is coated on the negative electrode layer 6, the second binder in the negative electrode layer 6 may be prevented from swelling into the electrolyte layer 5, thereby preventing degradation of the sulfide-based solid electrolyte in the electrolyte layer 5, caused by the second binder.

Thereafter, sheets including the positive electrode structure, the electrolyte layer 5, and the negative electrode structure are pressed to manufacture an all-solid battery 1. The all-solid battery 1 may then be heat-treated to cross-link the first binders of the positive electrode and the negative electrode by a cross-linking agent. According to an embodiment of the present disclosure, each layer of the all-solid battery 1 is prepared by coating, and thus, a surface area of each layer may be enlarged easily, thereby easily manufacturing a large capacity all-solid battery 1.

Hereinafter, the present disclosure will be described in greater detail with reference to following Examples. The following Examples are for illustrative purposes only and are not intended to limit the scope of the present disclosure. Also, all processes in the Examples and Comparative Examples were performed at a dew point temperature of −55° C. or less in a dry room.

Example 1

Preparing an Adhesive Layer

Graphite (KS-4, available from Timcal, the same below) and acetylene black (available from Denki Chemicals, the same below) as the adhesive layer conductive materials, styrene-based thermoplastic elastomer (hereinafter, binder A) (S.O.E 1611 available from Asahi Chemicals, the same below) as the first binder, and acid modified PVDF (hereinafter, binder B) (KF9200, available from Kureha, the same below) as the second binder were weighed in a mass % ratio of 60:10:15:15. The above materials and a suitable amount of N-methyl-2-pyrrolidone ("NMP") were inserted into a planetary mixer and mixed at 3,000 revolutions per minute ("rpm") for 5 minutes to prepare an adhesive layer coating solution.

Then, an aluminum foil current collecting member having a thickness of 20 micrometers ("μm") was provided on a desktop screen printer (a product of Newlong precision industry, the same below) as a positive current collector 2 and an adhesive layer coating solution was coated on the aluminum foil current collecting member by using a screen of 400 meshes. Thereafter, the positive current collector 2 coated with the adhesive layer coating solution was vacuum dried at a temperature of 80° C. for 12 hours. As a result, an adhesive layer 3 was formed on the positive current collector 2. A thickness of the adhesive layer 3 after drying was 7 μm.

Preparing a Positive Electrode Layer

LiNiCoAlO$_2$ ternary powder as the positive active material, Li$_2$S—P$_2$S$_5$ (molar % of 80:20) amorphous powder as the sulfide-based solid electrolyte, and vapor-grown carbon fiber powder as the positive electrode layer conductive material were weighed at a weight % ratio of 60:35:5 and then mixed to prepare a mixture, lithium tetracyanoborate (a product of Japanese Catalyst Co.) was weighed at 0.5 parts by weight based on 100 parts by weight of the mixture, and then the mixture and lithium tetracyanoborate were mixed by using a planetary mixer to prepare a powdered mixture.

A xylene solution in which binder A is dissolved as a positive binder was added to the powdered mixture, such that an amount of the binder A is 1.0 weight % based on a total weight of the powdered mixture to prepare a first mixture solution. A suitable amount of dehydrated xylene for adjusting viscosity was added to the first mixture solution to prepare a second mixture solution. To improve the dispersibility of the powdered mixture, a zirconia ball having a diameter of 5 millimeters ("mm") was added to the second mixture solution, such that each of empty space, the zirconia ball, and the powdered mixture may occupy ⅓ of a total volume of a mixture container, to prepare a third mixture solution. The third mixture solution was added to the planetary mixer and then stirred at 3,000 rpm for 3 minutes to prepare a positive electrode layer coating solution.

Thereafter, a sheet including the positive current collector 2 and the adhesive layer 3 was provided on the desktop screen printer, and the positive electrode layer coating solution was coated on the sheet by using a metal mask having a thickness of 150 μm. Then, the sheet coated with the positive electrode layer coating solution was dried by using a hot plate at a temperature of 40° C. for 10 minutes, and then vacuum dried at a temperature of 40° C. for 12 hours. As a result, the positive electrode layer 4 was formed on the adhesive layer 3. A total thickness of the positive current collector 2, the adhesive layer 3, and the positive electrode layer 4 was about 165 μm.

Then, the sheet including the positive current collector 2, the adhesive layer 3, and the positive electrode layer 4 was roll pressed by using a roll press machine having a gap of 10 μm to manufacture a positive electrode structure. A thickness of the positive electrode structure was about 120 μm.

Preparing a Negative Electrode Layer

Graphite powder (vacuum dried at a temperature of 80° C. for 24 hours) as the negative active material, binder A as the first binder, and a binder C (a polyamic acid-type polyimide polymer, HCl1000S available from Hitachi Chemicals) as the second binder were weighed into a weight % ratio of 94.5: 0.5:5.0. The materials described above and a suitable amount of NMP were inserted into a planetary mixer and then stirred at 3,000 rpm for 3 minutes, and then defoamed for one minute to prepare a negative electrode layer coating solution.

Thereafter, as the negative current collector 7, a copper current collector having a thickness of 16 μm was prepared, and the negative electrode layer coating solution was coated on the copper current collector by using a blade. A thickness (gap) of the negative electrode layer coating solution on the copper current collector was about 150 μm.

A sheet coated with the negative electrode layer coating solution was stored in a dryer heated to a temperature of 80° C. and then dried for 20 minutes. Thereafter, the sheet including the negative current collector 7 and the negative electrode layer 6 was roll pressed by using a roll press machine having a gap of 10 μm to prepare a negative electrode structure. A thickness of the negative electrode structure was about 100 μm. The sheet after rolling was vacuum-heated at a temperature of 300° C. for 2 hours. As a result, a negative electrode layer 6 in which a binder C is imidized was prepared.

Preparing an Electrolyte Layer

A xylene solution of binder A (an electrolyte layer binder) was added such that a proportion of the binder A is 1 weight %, sulfur was added as a cross-linking agent in a proportion of 0.2 weight %, and magnesium oxide was added as a cross-linking catalyst in a proportion of 0.05 weight % to Li$_2$S—P$_2$S$_5$ (molar % of 80:20) amorphous powder, which was used as a sulfide-based solid electrolyte, based on the weight of the Li$_2$S—P$_2$S$_5$ amorphous powder to prepare a first mixture solution. A suitable amount of dehydrated xylene for adjusting viscosity was added to the first mixture solution to prepare a second mixture solution. To improve the dispersibility of a powdered mixture, a zirconia ball having a diameter of 5 mm was added to the second mixture solution, such that each of empty space, the zirconia ball, and the powdered mixture occupies ⅓ of a total volume of a mixture container, to prepare a third mixture solution. The third mixture solution was added to a planetary mixer and then stirred at 3,000 rpm for 3 minutes to prepare an electrolyte layer coating solution.

Thereafter, the negative electrode structure was provided on the desktop screen printer, and the electrolyte layer coating solution was coated on the negative electrode structure by using a metal mask having a thickness of 200 μm. Then, a sheet coated with the electrolyte layer coating solution was dried by using a hot plate at a temperature of 40° C. for 10 minutes, and then dried at a temperature of 40° C. for 12 hours. As a result, an electrolyte layer 5 was formed on the negative electrode structure. A thickness of the electrolyte layer 5 after drying was about 130 μm.

Preparing an All-Solid Battery

A negative electrode structure, a sheet including an electrolyte layer 5, and a positive electrode structure were each hole-punched with a Thompson knife blade, and the electrolyte layer 5 and a positive electrode layer 4 of the positive electrode structure were bound together through a dry lamination method by using a roll press machine having a roll gap of 50 μm.

Examples 2 Through Example 7

An all-solid battery was manufactured in the same manner as in Example 1, except that the cyano compound of Formula 1 and an amount thereof was changed as in Table 1 below.

Comparative Example 1

An all-solid battery was manufactured in the same manner as in Example 1, except that the cyano compound of Formula 1 was not added.

Evaluating Battery Characteristics

The unit cells prepared in the Examples and Comparative Example described above were charged at constant current density of 0.05 milliamperes per square centimeter ("mA/cm$^2$") by using TOSCAT-3100, which is a charge and discharge evaluation apparatus available from Dongyang Systems, and then subsequently discharged to measure discharge capacity (milliampere-hour, mA·h) (upper limit charge voltage of 4.0 volts ("V") and lower limit discharge voltage of 2.5 V).

Discharge capacities (milliampere-hour per gram, mA·h/g) of the unit cells prepared in Examples and Comparative Example at the lower limit discharge voltage of 2.5 V are shown in Table 1 below.

TABLE 1

| | Compound | Formula | Amount (weight %) | Discharge capacity (mA · h/g) |
|---|---|---|---|---|
| Example 1 | lithium tetracyanoborate | LiB(CN)$_4$ | 0.5 | 99 |
| Example 2 | lithium tetracyanoborate | LiB(CN)$_4$ | 1 | 107 |
| Example 3 | lithium tetracyanoborate | LiB(CN)$_4$ | 3 | 103 |
| Example 4 | lithium tetracyanoborate | LiB(CN)$_4$ | 5 | 95 |
| Example 5 | lithium tetracyanoaluminate | LiAl(CN)$_4$ | 1 | 101 |
| Example 6 | lithium tetracyanogallate | LiGa(CN)$_4$ | 1 | 102 |
| Example 7 | lithium tricyanotrifluorophosphate | LiPF$_3$(CN)$_3$ | 1 | 98 |
| Comparative Example 1 | — | — | — | 88 |

From Table 1 above, it may be seen that inclusion of the cyano compound of Formula 1 in the positive electrode increases discharge capacity. This suggests that formation of a highly resistive layer at an interface between the positive active material and the sulfide-based solid electrolyte was inhibited due to the cyano compound.

As described above, according to the one or more embodiments of the present disclosure above, a positive electrode for an all-solid battery having excellent battery characteristics and an all-solid battery including the positive electrode may be provided by inhibiting formation of a highly resistive layer at an interface between a positive active material and a solid electrolyte without forming a coating layer for preventing a reaction between the solid electrolyte and the positive active material.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims.

What is claimed is:
1. A positive electrode for an all-solid battery comprising a positive active material;
a conductive material; and
a binder,
wherein the positive electrode further comprises a cyano compound represented by Formula 1:

$$M[A(CN)x] \qquad \text{Formula 1}$$

wherein in Formula 1,
A is at least one selected from boron, gallium, aluminum, fluorine, phosphorus, and carbon,
M is at least one alkali metal selected from lithium and sodium, and
x is an integer of 1 to 4,
wherein the cyano compound is attached to at least a portion of the positive active material or is located adjacent to the positive active material.

2. The positive electrode of claim 1, wherein the cyano compound is lithium tetracyanoborate.

3. The positive electrode of claim 1, wherein the positive electrode comprises a layered halite structure.

4. The positive electrode of claim 1, wherein the positive active material comprises a lithium-containing transition metal oxide,
wherein the lithium-containing transition metal oxide comprises at least one element selected from nickel, cobalt, and manganese.

5. The positive electrode of claim 1, wherein the cyano compound is present in an amount of about 0.5 parts by weight to about 10 parts by weight based on 100 parts by weight of a total weight of the positive active material, the conductive material, and the binder.

6. An all-solid battery comprising:
a positive electrode;
a negative electrode; and
an electrolyte layer disposed between the positive electrode and the negative electrode and comprising a solid electrolyte, wherein
the positive electrode is the positive electrode according to claim 1.

7. The all-solid battery of claim 6, wherein the solid electrolyte comprises a sulfide-containing solid electrolyte.

8. The all-solid battery of claim 6, wherein the solid electrolyte comprises a lithium-ion conductive crystalline glass.

9. The all-solid battery of claim 8, wherein the solid electrolyte comprises lithium sulfide as a first component, and at least one compound selected from silicon sulfide, phosphorus sulfide, germanium sulfide, and boron sulfide as a second component.

* * * * *